UNITED STATES PATENT OFFICE.

NATHAN SULZBERGER, OF NEW YORK, N. Y.

CATALYZER CONTAINING SILICON AND PROCESS FOR MAKING SAME.

1,143,332. Specification of Letters Patent. Patented June 15, 1915.

No Drawing. Application filed February 25, 1914. Serial No. 820,874. REISSUED

*To all whom it may concern:*

Be it known that I, NATHAN SULZBERGER, born in New York city, and a citizen of the United States, residing at New York city, in the county and State of New York, have invented new and useful Improvements in Catalyzers Containing Silicon and Processes for Making Same, of which the following is a specification.

In all cases where catalyzers have been used, it has been found that their efficiency is increased, when such catalyzers are most finely distributed in the medium, which is to be treated. One of the methods for accomplishing such fine distribution is to impregnate an inert substance with the substance which is to be used as a catalyzer. As such inert substances have been proposed among others, kieselguhr, kaolin, asbestos and the like. The mode generally employed was to endeavor to saturate such substances with a solution, generally aqueous, of a substance, which was then brought into its catalytic form. Thus, for instance, kaolin was brought in contact with an aqueous solution of a nickel-salt, the product then subjected to a current of hydrogen, while being heated. It is necessary, of course, to have the kaolin in a finely divided condition, which requires time, labor and machinery; besides such substances lack purity and uniformity. I have found that a more complete, minute and much simpler method of finely dividing and spreading a catalytically efficient substance over an inert material containing silicon, silica or other compounds containing silicon, is by utilizing a chemical compound containing silicon and such substance, which is to be used as a catalyzer. By this method, since the original molecule contained both substances, the resultant product, which is to be catalytically employed, will be most intimately distributed among the silicon-containing substance. Thus the product described in the following example, even when brought to an impalpable powder of velvety feel, appears under the microscope black, due its nickel-contents, in every particle.

As an illustration I cite the following: An aqueous solution of a nickel-salt was treated with a solution of sodium-silicate. The precipitate was filtered off, dried and subjected to a current of hydrogen, while being heated. A black powder was obtained. This substance was used as a catalyzer, for instance, in hydrogenating oils, with which it can readily be mixed, remaining well in suspension, which fact may be due that the product likely contains silicic acid also in a colloidal condition.

Various modifications of the above described illustration of my invention may be employed. Thus, in some cases, the reduction of the metal-silicate may be accomplished in solution by means, for instance, of hydrazin or some other reducing agent. Mixtures of substances, as, for instance, of silicates: nickel silicate with small amounts of palladium, may be employed. All such and other modifications come under the scope of this invention, the fundamental idea of which is the utilization of a chemical combination *per se* or in mixture containing silicon and a metal, which is catalytically efficient.

The claims cover not only the particularly specified ingredient (silicate, silicates, silica impregnated with metal, etc.), but also all mixtures of same with substances, as will not destroy the use of product as a catalyst. By the term "free from anti-catalytic material" in claims: 1, 2 and 3, is meant, free from anticatalytic material and such amounts of same, as will destroy the catalytic action of the product. The word "hydrogen" in the following claims also includes mixtures containing this element, as well as all such other processes, which are effective reducing agents in consequence of their hydrogen contents.

I claim:

1. A process of making a catalyst, which comprises reducing a silicate of a catalytic metal with a reducing agent free from anticatalytic material.

2. A process of making a catalyst, which comprises reducing a silicate of catalytic metals with a reducing agent free from anticatalytic material.

3. A process of making a catalyst, which comprises reducing nickel silicate with a reducing agent free from anticatalytic material.

4. Process of making a catalyst, consisting in reducing a silicate of a catalytic metal by means of hydrogen.

5. Process of making a catalyst, consisting in reducing a silicate of catalytic metals by means of hydrogen.

6. Process of making a catalyst, consisting in reducing nickel silicate by means of hydrogen.

7. Catalytically active nickel finely spread over silica, insoluble in water and of uniform appearance under the microscope.

8. Product possessing catalytic action containing silica finely impregnated with a metal possessing catalytic action, such impregnated silica being of uniform appearance under the microscope.

9. Product possessing catalytic action containing silica finely impregnated with metals possessing catalytic action, such impregnated silica being of uniform appearance under the microscope.

NATHAN SULZBERGER.

Witnesses:
WOLDEMAR HAUPT,
HENRY HASPER.